(12) United States Patent
McDonald (10) Patent No.: US 11,506,289 B2
(45) Date of Patent: Nov. 22, 2022

(54) REGULATOR VALVE ASSEMBLY AND COMPONENTS THEREOF

(71) Applicant: Flow International Corporation, Kent, WA (US)

(72) Inventor: Michael C. McDonald, Lake Tapps, WA (US)

(73) Assignee: Flow International Corporation, Kent, WA (US)

( * ) Notice: Subject to any disclaimer, the term of this patent is extended or adjusted under 35 U.S.C. 154(b) by 543 days.

(21) Appl. No.: 16/075,938

(22) PCT Filed: Feb. 15, 2017

(86) PCT No.: PCT/US2017/017989
§ 371 (c)(1),
(2) Date: Aug. 6, 2018

(87) PCT Pub. No.: WO2017/142957
PCT Pub. Date: Aug. 24, 2017

(65) Prior Publication Data
US 2019/0040962 A1    Feb. 7, 2019

Related U.S. Application Data

(60) Provisional application No. 62/296,423, filed on Feb. 17, 2016.

(51) Int. Cl.
*F16K 1/38* (2006.01)
*F16K 1/42* (2006.01)
*F16K 47/02* (2006.01)

(52) U.S. Cl.
CPC ............... *F16K 1/385* (2013.01); *F16K 1/42* (2013.01); *F16K 47/02* (2013.01); *F16K 47/023* (2013.01)

(58) Field of Classification Search
CPC . F16K 1/385; F16K 1/42; F16K 47/02; F16K 47/023
See application file for complete search history.

(56) References Cited

U.S. PATENT DOCUMENTS 1,716,722 A * 6/1929 Fausek ...................... F16K 1/36
137/543.13
1,807,594 A * 6/1931 Hopkins .................. F16K 1/385
137/535

(Continued)

FOREIGN PATENT DOCUMENTS

DE    25 41 155 A1    9/1976
DE    102 60 662 A1   7/2004

(Continued)

OTHER PUBLICATIONS

European Patent Office; International Search Report and Written Opinion of the International Searching Authority; dated Apr. 25, 2017; 11 pages.

(Continued)

*Primary Examiner* — Eric Keasel
(74) *Attorney, Agent, or Firm* — Cozen O'Connor (57) ABSTRACT

A regulator valve assembly is provided for use in connection with high pressure fluid systems. The regulator valve assembly includes a valve pin having an engagement portion with a tapered surface and a valve seat having a valve pin receiving aperture defining a tapered surface on the valve seat to sealingly mate with the engagement portion of the valve pin. At least one of the valve pin and the valve seat includes an asymmetrical surface feature sized and shaped such that, when the valve pin is displaced away from the seated configuration and fluid flows through an annular space created between the engagement portion of the valve pin and the valve seat, unbalanced hydrodynamic forces (Continued)

arise from an interaction of the fluid with the asymmetrical surface feature. Systems incorporating the regulator valve assembly are also provided.

23 Claims, 7 Drawing Sheets

(56) References Cited

U.S. PATENT DOCUMENTS

| | | |
|---|---|---|
| 2,720,838 A | 9/1951 | Dahl |
| 2,730,125 A | 1/1956 | Thatcher et al. |
| 4,114,851 A | 9/1978 | Shivak et al. |
| 4,620,562 A | 11/1986 | Pacht |
| 4,679,592 A | 7/1987 | Lamb |
| 5,564,469 A | 10/1996 | Tremoulet, Jr. et al. |
| 6,588,724 B2 | 7/2003 | Yie |
| 6,796,741 B1 | 9/2004 | DeVaull, III et al. |
| 6,863,475 B2 | 3/2005 | DeVaull, III et al. |
| 7,832,653 B2 | 11/2010 | Yukimoto |
| 8,814,140 B2* | 8/2014 | Karl ............... F16K 1/42 251/333 |
| 10,054,118 B2 | 8/2018 | Hopkins |
| 2003/0106594 A1 | 6/2003 | Saurwein et al. |
| 2006/0151031 A1 | 7/2006 | Krenzer et al. |
| 2014/0311596 A1 | 10/2014 | Kim et al. |
| 2015/0004036 A1* | 1/2015 | Hopkins ............... F16K 31/122 417/559 |

FOREIGN PATENT DOCUMENTS

| | | |
|---|---|---|
| EP | 2 851 589 A1 | 3/2015 |
| EP | 3 023 675 A1 | 5/2016 |
| FR | 2971574 A1 | 8/2012 |
| GB | 1 214 863 | 12/1970 |
| GB | 2117094 A | 10/1983 |
| JP | 49-81920 | 8/1974 |
| JP | H0861554 A | 3/1996 |
| JP | H0932936 A | 2/1997 |
| JP | 2011047483 A | 3/2011 |
| WO | 2013/109473 A1 | 7/2013 |

OTHER PUBLICATIONS

European Search Report, dated Nov. 27, 2020 for EP Application No. 20206057.0, 8 pages.

* cited by examiner

REGULATOR VALVE ASSEMBLY AND COMPONENTS THEREOF

BACKGROUND

Technical Field

This disclosure relates to regulator valves and, more particularly, to regulator valves for use in connection with regulating the pressure of fluid supplied by high pressure and ultrahigh pressure fluid pumps for fluid jet cutting and other activities.

Description of the Related Art

Numerous tasks, for example, cutting sheet metal or abrading a surface, may be accomplished through the use of a stream of pressurized fluid, typically water, which is generated by high pressure or ultrahigh pressure, positive displacement pumps, including, for example, those capable of generating pressurized fluid up to and beyond 87,000 psi and including over 100,000 psi. Such pumps pressurize a fluid by having a reciprocating plunger that draws the fluid from an inlet area into a pressurization chamber during an intake stroke, and acts against the fluid during a pumping stroke, thereby forcing pressurized fluid to pass from the pressurization chamber to an outlet chamber where it is collected to be used by an operator via whatever tool has been attached to the pump for a particular task.

During the normal course of operation, the required flow rate will vary from the maximum the pump can supply to zero, for example, when the operator turns the tool off. In this situation, where the pressurized fluid is not being used, the pressure in the outlet chamber will build up beyond an acceptable level unless some form of pressure control is incorporated into the pump. If no pressure regulation is provided, the buildup of pressure will result in damage and stress to the parts of the pump and undesirable surges of pressure will occur when the operator again turns the tool on.

One method of pressure control that is currently used is to incorporate a regulator valve (also sometimes referred to as a relief valve) into the pump system. When the pressure in the outlet chamber rises above a preset limit as a result of pressurizing more water than is demanded, the regulator valve opens to vent or relieve the pressurized fluid. A regulator valve may be direct acting, meaning that pressurized fluid acts directly to open a poppet that is being held in a closed position by a control force, such as, for example a spring or other biasing mechanism. Example regulator or relief valves are shown and described in U.S. Pat. No. 5,564,469, which is incorporated herein by reference in its entirety, and which is assigned to the assignee of the present application, Flow International Corporation of Kent, Wash. While currently available direct acting regulator valves for use in connection with high pressure and ultrahigh pressure pumps provide suitable pressure regulation under many operating conditions, in some instances, a pressure signal corresponding to the system pressure can oscillate unsatisfactorily above and below a desired pressure due to variations in the hydrostatic and hydrodynamic forces acting on the regulator valve during operation. Applicants believe improved regulator valves less susceptible to pressure oscillations are desirable.

BRIEF SUMMARY

The regulator valve assemblies described herein are particularly well suited for use in connection with fluid supplied by high pressure and ultrahigh pressure pumps to provide pressure regulating functionality in a manner that results in an exceptionally stable and consistent operating pressure.

According to one embodiment, a regulator valve assembly may be summarized as including a valve pin having an engagement portion with a tapered surface, and a valve seat having a valve pin receiving aperture defining a tapered surface on the valve seat to sealingly mate with the engagement portion of the valve pin when the valve pin is seated against the valve seat in a seated configuration. At least one of the valve pin and the valve seat may further include an asymmetrical surface feature sized and shaped such that, when the valve pin is displaced away from the seated configuration and fluid flows through an annular space created between the engagement portion of the valve pin and the valve seat, unbalanced hydrodynamic forces arise from an interaction of the fluid with the asymmetrical surface feature. The unbalanced hydrodynamic forces may bias the valve pin away from a central axis of the valve seat. The regulator valve assembly may further include a housing defining a fluid outlet chamber, and the valve seat may be positioned within the housing such that, when the valve pin is displaced away from the seated configuration, the annular space created between the engagement portion of the valve pin and the valve seat is in fluid communication with the fluid outlet chamber and an end of the valve pin is biased away from a centerline of the valve seat toward a sidewall of the housing within the confines of the valve pin receiving aperture.

In some instances, the asymmetrical surface feature may be formed in the valve pin and the tapered surface of the valve pin may have a draft angle between about two and about five degrees at least in an immediate area next to the asymmetrical surface feature. In some instances, the asymmetrical surface feature may be formed in the valve seat and the tapered surface of the valve seat defined by the valve pin receiving aperture may have a draft angle between about two and about five degrees at least in an immediate area next to the asymmetrical surface feature.

In some instances, the valve pin may define a central axis and the asymmetrical surface feature may be formed in the valve pin and may be at most symmetric about only one plane of symmetry that includes the central axis of the valve pin. The asymmetrical surface feature may be, for example, an indentation, depression, notch, hole, aperture or cavity provided in a side of the valve pin. The asymmetrical surface feature may be located entirely to one side of a vertical reference plane that includes the central axis of the valve pin and bisects the valve pin. The asymmetrical surface feature may be bound by a reference prism defined by the vertical reference plane and a semicircular outer edge of the valve pin projected along a height of the asymmetrical surface feature. The asymmetrical surface feature may be offset from a terminal end of the valve pin, or may extend to the terminal end. One or more annular grooves may be provided on the tapered surface of the engagement portion of the valve pin, and at least one of the annular grooves may be positioned near the asymmetric surface feature. The asymmetrical surface feature may be formed from a material removal process or an additive manufacturing process.

In some instances, the asymmetrical surface feature may be formed in the valve seat and may be at most symmetric about only one plane of symmetry that includes the central axis of the valve seat. The asymmetrical surface feature may be, for example, an indentation, depression, notch, hole, aperture or cavity provided in the tapered surface of the valve seat. The asymmetrical surface feature may be located entirely to one side of a vertical reference plane that includes the central axis of the valve seat and bisects the valve seat. The asymmetrical surface feature may be bound by a reference prism defined by the vertical reference plane and a semicircular outer edge of the valve seat projected along a height of the asymmetrical surface feature. The asymmetrical surface feature may be offset from a terminal end of the valve seat, or extend to the terminal end. The asymmetrical surface feature may not extend entirely through the valve seat. The asymmetrical surface feature may be formed from a material removal process or an additive manufacturing process.

When the valve pin is displaced away from the seated configuration, the flow of fluid interacts with the asymmetric surface feature to cause an imbalance in hydrodynamic forces that disrupts an otherwise uniform flow path along a length of one side of the valve pin. As such, the unbalanced hydrodynamic forces may bias an end of the valve pin away from the central axis of the valve seat. The valve seat may include a fluid inlet conduit that is in fluid communication with the valve pin receiving aperture, and the valve pin may be positioned to be exposed to a fluid having variable pressure within the fluid inlet conduit of the valve seat during operation such that, when the pressure of the fluid is sufficient to overcome a control force which biases the valve pin toward the seated configuration, the valve pin is forced to move away from the seated configuration to create the annular space, thereby allowing fluid to pass through the annular space and interact with the asymmetrical surface feature. The asymmetrical surface feature may be configured to substantially stabilize a pressure signal corresponding to the pressure of the fluid passing through the annular space during operation, and/or substantially minimize the fluctuation in a pressure signal corresponding to the pressure of the fluid passing through the annular space during operation.

According to another embodiment, a valve seat operable with a tapered valve pin of a regulator valve assembly may be summarized as including a valve pin receiving aperture defining a tapered surface on the valve seat that is configured to sealingly mate with a portion of the tapered valve pin when the tapered valve pin is seated against the valve seat in a seated configuration, and an asymmetrical surface feature sized and shaped such that, when the valve pin is displaced away from the seated configuration and fluid flows through an annular space created between the engagement portion of the valve pin and the valve seat, unbalanced hydrodynamic forces arise from an interaction of the fluid with the asymmetrical surface feature. The unbalanced hydrodynamic forces may bias an end of the valve pin away from a central axis of the valve seat.

According to another embodiment, a valve pin of a regulator valve assembly that is operable with a valve seat having a valve pin receiving aperture that defines a tapered seat surface may be summarized as including an engagement portion with a tapered surface that is configured to sealingly mate with the tapered seat surface of the valve seat when the valve pin is urged against the valve seat in a seated configuration, and an asymmetrical surface feature sized and shaped such that, when the valve pin is displaced away from the seated configuration and fluid flows through an annular space created between the engagement portion of the valve pin and the valve seat, unbalanced hydrodynamic forces arise from an interaction of the fluid with the asymmetrical surface feature. The unbalanced hydrodynamic forces may bias an end of the valve pin away from a central axis of the valve seat.

According to yet another embodiment, a system may be summarized as including a pump operable to supply a source of fluid at high or ultrahigh pressures, and a regulator valve assembly in fluid communication with the source of fluid supplied by the pump. The regulator valve assembly may include a valve pin having an engagement portion with a tapered surface, and a valve seat having a valve pin receiving aperture defining a tapered surface on the valve seat to sealingly mate with the engagement portion of the valve pin when the valve pin is seated against the valve seat in a seated configuration. At least one of the valve pin and the valve seat may comprise an asymmetrical surface feature sized and shaped such that, when the valve pin is displaced away from the seated configuration and fluid flows through an annular space created between the engagement portion of the valve pin and the valve seat, unbalanced hydrodynamic forces arise from an interaction of the fluid with the asymmetrical surface feature. The unbalanced hydrodynamic forces may bias an end of the valve pin away from a central axis of the valve seat.

The system may further include a waterjet cutting apparatus configured to receive high pressure or ultrahigh pressure fluid from the pump, and the pressure of the fluid may be regulated at least in part by the regulator valve assembly.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known structures associated with high pressure and ultrahigh pressure fluid systems, including high pressure and ultrahigh pressure pumps, regulator or relief valves and components thereof, may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
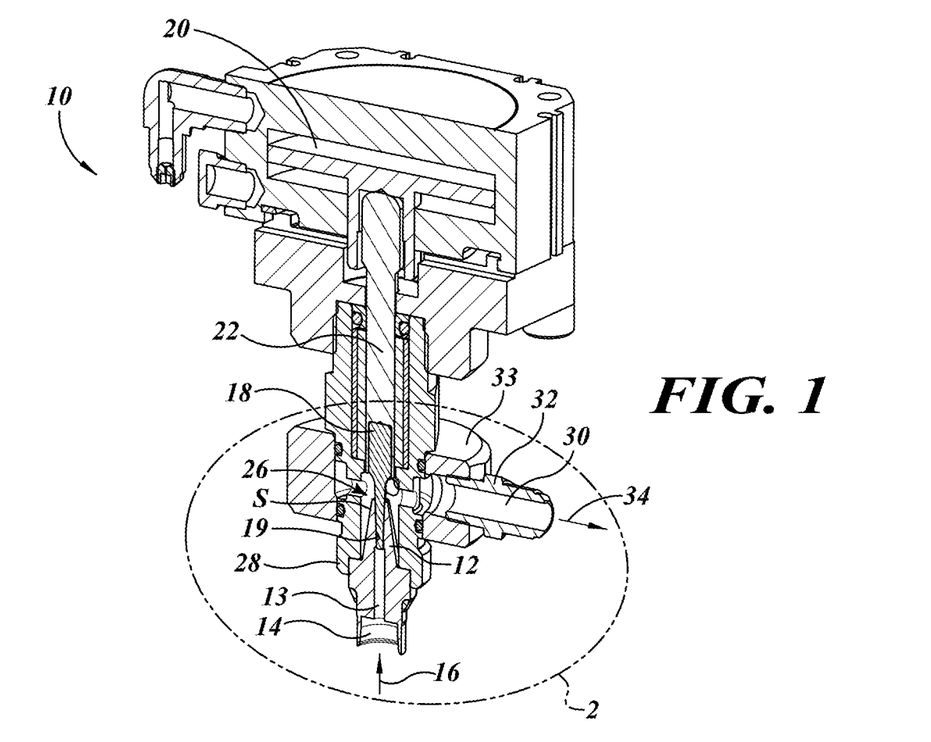
FIG. 1 is an isometric view of a regulator valve assembly, according to one example embodiment.
Figure 2:
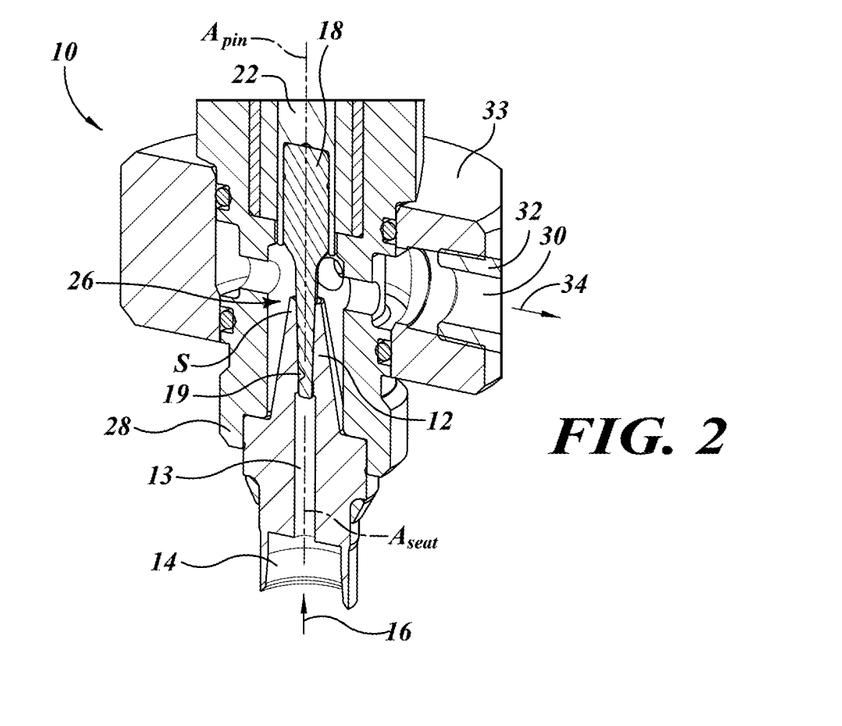
FIG. 2 is a partial, enlarged isometric view of the regulator valve assembly of FIG. 1.

FIGS. 1 and 2 show a regulator valve assembly 10 according to one example embodiment. The regulator valve assembly 10 is operable with a high pressure or ultrahigh pressure pump (not shown) or other fluid system to provide pressure regulating functionality with respect to operating pressures up to and beyond 87,000 psi and including over 100,000 psi. During operation, the pump pressurizes fluid, typically water, to pressures up to and beyond 87,000 psi, the pressurized fluid being collected and used by an operator via a tool (not shown) selected for a particular task, such as, for example, fluid jet cutting via a fluid jet nozzle (e.g., waterjet or abrasive waterjet cutting nozzle). During the normal course of operation, the regulator valve assembly 10 is used to relieve or bleed fluid to prevent over-pressurization which could otherwise result in damage and stress to parts of the pump and undesirable surges when the tool is reactivated.

As shown in FIGS. 1 and 2, the regulator valve assembly 10 is provided with a female valve seat 12 which is configured to be in fluid communication with a source of pressurized fluid (e.g., a high pressure or ultrahigh pressure pump) via inlet conduit 13 and inlet port 14, as represented by the arrow labeled 16. A male poppet or valve pin 18 is provided to mate with the valve seat 12, the valve pin 18 being urged into contact with the valve seat 12 by a control force that is generated by a pneumatic actuator 20 acting on the valve pin 18 via a plunger 22 or other suitable biasing arrangement.

As shown in FIG. 1, a significant portion of the valve pin 18 is positioned within the valve seat 12 to sealingly engage the valve seat 12 in a seated configuration S. When the pressure of the fluid increases sufficiently to overcome the control force, the valve pin 18 is forced to move in the direction of the fluid flow to create clearance between the valve pin 18 and the valve seat 12, thereby allowing a volume of pressurized fluid to pass through the valve seat 12 to an outlet chamber 26 of a housing 28 enclosing the interface of the valve seat 12 and valve pin 18 and ultimately through an outlet passage 30 of an outlet adapter 32 coupled to a housing component 33 that is sealingly engaged with the housing 28, as represented by the arrow labeled 34.

FIGS. 3 through 6B illustrate further details of the valve seat 12 and the valve pin 18. As shown, the valve pin 18 includes an elongated engagement portion 38 with a tapered surface 40. The valve seat 12 has a valve pin receiving aperture 42 (i.e., the space that is occupied by the engagement portion 38 of the valve pin 18 in FIGS. 3 and 4) which defines a tapered surface 44 on the valve seat 12 to sealingly mate with the engagement portion 38 of the valve pin 18 when the valve pin 18 is seated against the valve seat 12 in the seated configuration S (FIGS. 1-4). The valve pin 18 and/or the valve seat 12 may further comprise an asymmetrical surface feature (e.g., notch 19 in one side of valve pin 18) that is positioned, sized and shaped such that, when the valve pin 18 is displaced away from the seated configuration S to an open configuration O (FIG. 5) and fluid flows through an annular space 48 created between the engagement portion 38 of the valve pin 18 and the valve seat 12, unbalanced hydrodynamic forces arise from an interaction of the fluid with the asymmetrical surface feature (e.g., notch 19) to bias an end 50 of the valve pin 18 away from a central axis $A_{seat}$ of the valve seat 12.

Figure 5:
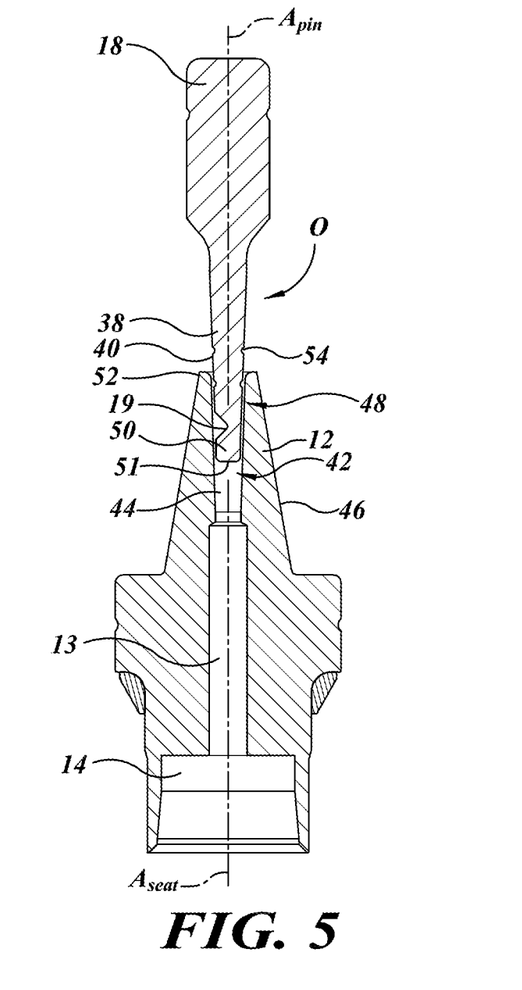
FIG. 5 is a cross-sectional view of the valve pin and valve seat of the regulator valve assembly of FIG. 1 shown in an open configuration.

It will be understood that the valve pin 18 may be displaced axially (i.e., in a direction along the central axis $A_{seat}$ of the valve seat 12) to varying degrees based on changes in system pressure to create the space 48 through which pressurized fluid can escape, thereby forming a variable orifice mechanism. Accordingly, the space 48 may also be referred to as a variable orifice.

By providing an asymmetrical surface feature (e.g., notch 19 at the end 50 of the valve pin 18) to asymmetrically disrupt the flow of fluid through the variable orifice 48 of the regulator valve assembly 10, a pressure signal corresponding to the system pressure may be substantially stabilized relative to a similar configuration lacking such an asymmetric surface feature by significantly changing the dynamics of the system and biasing the valve pin 18 away from a central axis $A_{seat}$ of the valve seat 12. In other words, the asymmetrical surface feature may substantially minimize fluctuations in the pressure signal by biasing an end 50 of the valve pin 18 away from the central axis $A_{seat}$ of the valve seat 12 as the fluid passes through the variable orifice 48 during operation and interacts with the asymmetrical surface feature to generate unbalanced hydrodynamic forces around the valve pin 18.

As discussed earlier, a housing 28 (FIGS. 1 and 2) may enclose the interface of the valve seat 12 and valve pin 18 and define an outlet chamber 26. The valve seat 12 may be positioned within the housing 28 such that, when the valve pin 18 is displaced away from the seated configuration S, the annular space 48 created between the engagement portion 38 of the valve pin 18 and the valve seat 12 is in fluid communication with the fluid outlet chamber 26 and an end 50 of the valve pin 18 is biased away from a centerline or central axis $A_{seat}$ of the valve seat 12 toward a sidewall of the housing 28 within the confines of the valve pin receiving aperture 42.

Figure 6A:
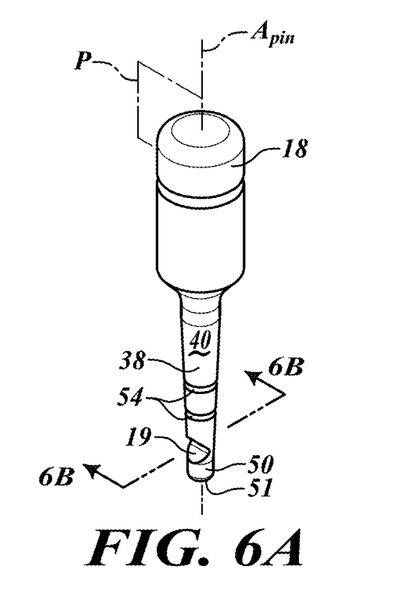
FIG. 6A is an isometric view of the poppet or valve pin of the regulator valve assembly of FIG. 1, showing an asymmetric surface feature thereof in greater detail.
Figure 6B:
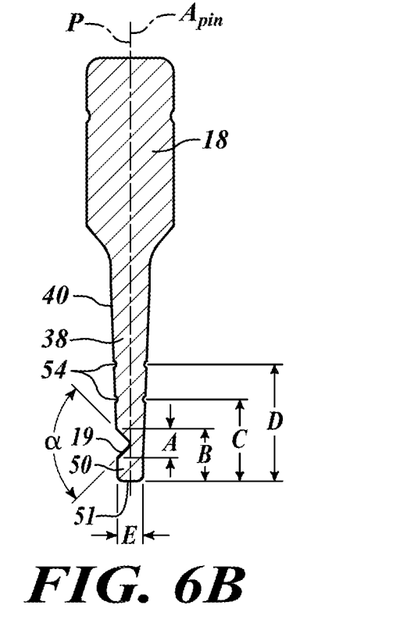
FIG. 6B is a cross-sectional view of the poppet or valve pin of FIG. 6A taken along line 6B-6B.
Figure 7A:
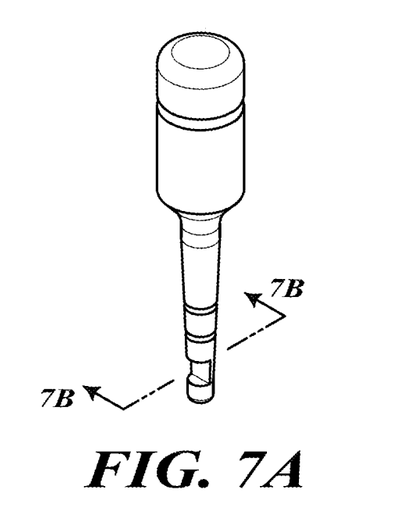
FIG. 7A is an isometric view of a poppet or valve pin, according to another embodiment.
Figure 7B:
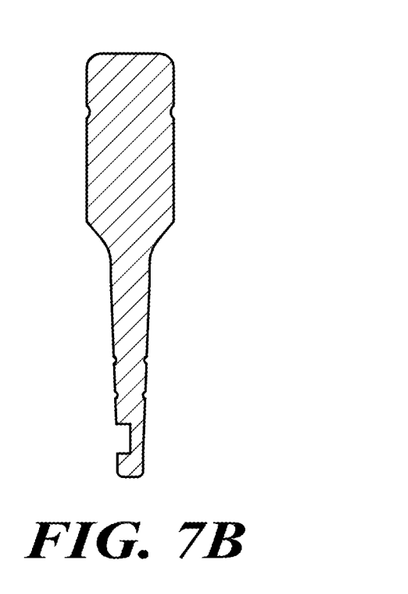
FIG. 7B is a cross-sectional view of the poppet or valve pin of FIG. 7A taken along line 7B-7B.
Figure 8A:
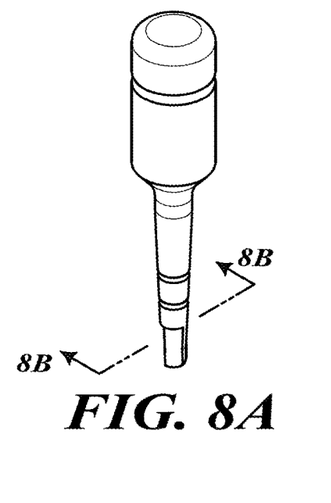
FIG. 8A is an isometric view of a poppet or valve pin, according to another embodiment.
Figure 8B:
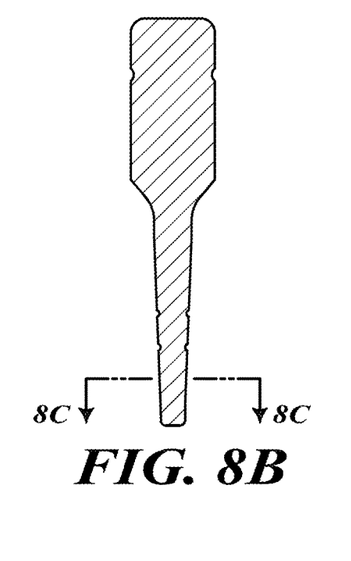
FIG. 8B is a cross-sectional view of the poppet or valve pin of FIG. 8A taken along line 8B-8B.
Figure 8C:
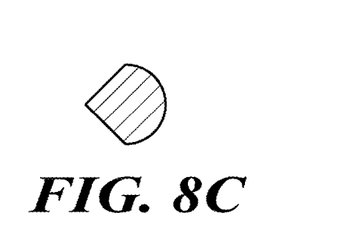
FIG. 8C is a cross-sectional view of the poppet or valve pin of FIG. 8A taken along line 8C-8C in FIG. 8B.
Figure 9A:
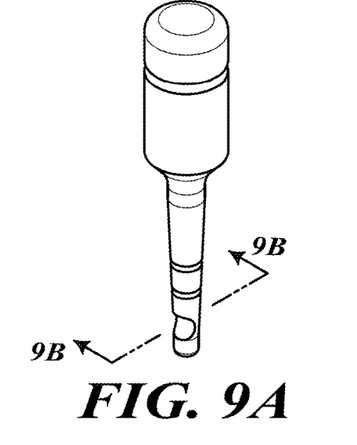
FIG. 9A is an isometric view of a poppet or valve pin, according to another embodiment.
Figure 9B:
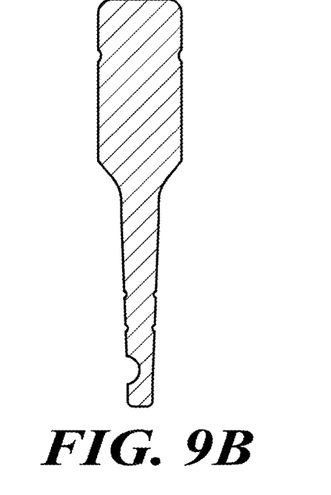
FIG. 9B is a cross-sectional view of the poppet or valve pin of FIG. 9A taken along line 9B-9B.
Figure 10A:
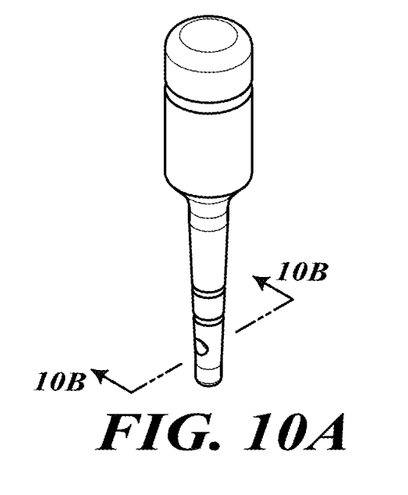
FIG. 10A is an isometric view of a poppet or valve pin, according to another embodiment.
Figure 10B:
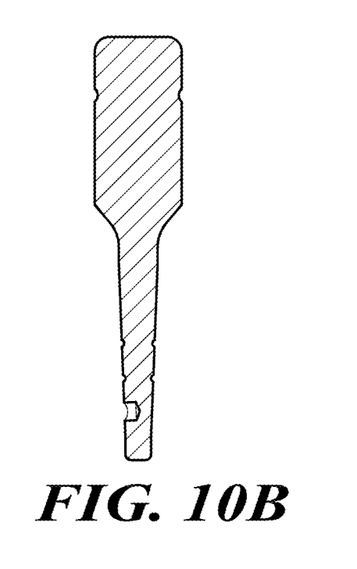
FIG. 10B is a cross-sectional view of the poppet or valve pin of FIG. 10A taken along line 10B-10B.
Figure 11A:
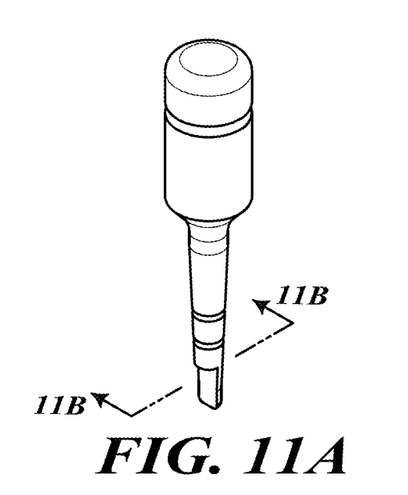
FIG. 11A is an isometric view of a poppet or valve pin, according to another embodiment.
Figure 11B:
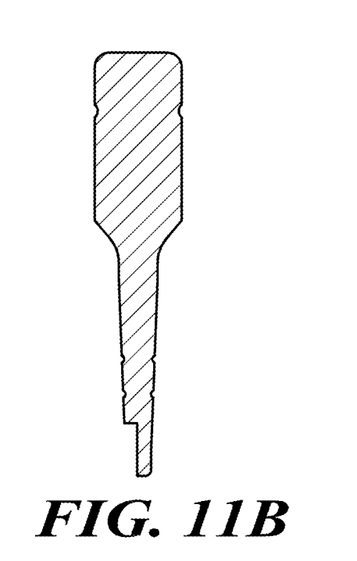
FIG. 11B is a cross-sectional view of the poppet or valve pin of FIG. 11A taken along line 11B-11B.
Figure 12A:
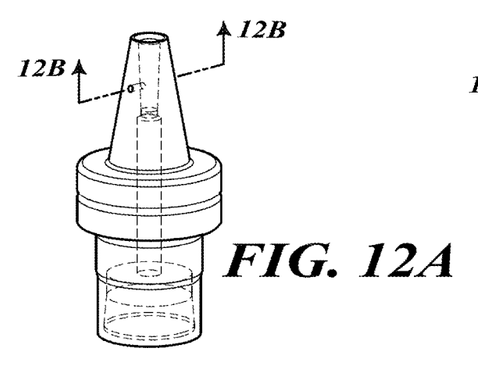
FIG. 12A is an isometric view of a valve seat, according to one embodiment, showing internal features thereof in broken lines.
Figure 12B:
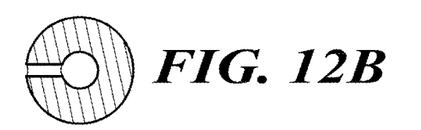
FIG. 12B is a cross-sectional view of the valve seat of FIG. 12A taken along line 12B-12B.
Figure 13A:
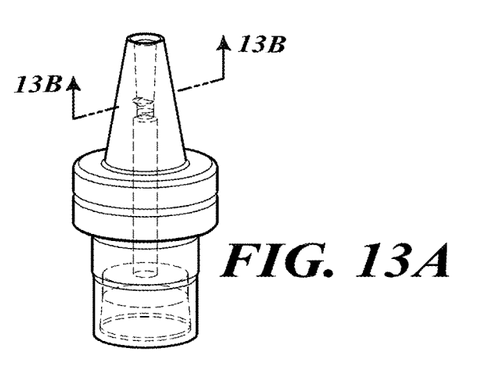
FIG. 13A is an isometric view of a valve seat, according to another embodiment, showing internal features thereof in broken lines.
Figure 13B:
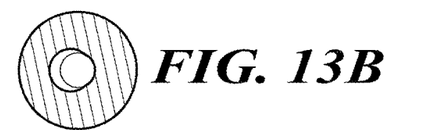
FIG. 13B is a cross-sectional view of the valve seat of FIG. 13A taken along line 13B-13B.
Figure 14A:
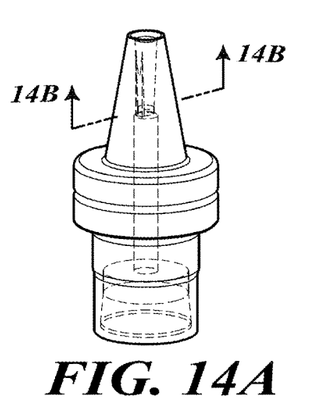
FIG. 14A is an isometric view of a valve seat, according to another embodiment, showing internal features thereof in broken lines.
Figure 14B:
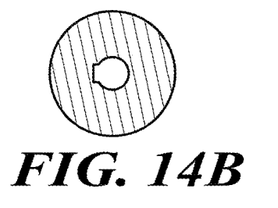
FIG. 14B is a cross-sectional view of the valve seat of FIG. 14A taken along line 14B-14B.
Figure 15A:
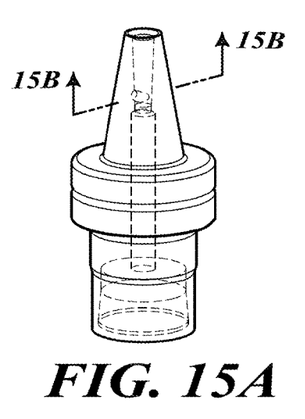
FIG. 15A is an isometric view of a valve seat, according to another embodiment, showing internal features thereof in broken lines.
Figure 15B:
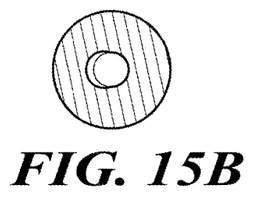
FIG. 15B is a cross-sectional view of the valve seat of FIG. 15A taken along line 15B-15B.
Figure 16A:
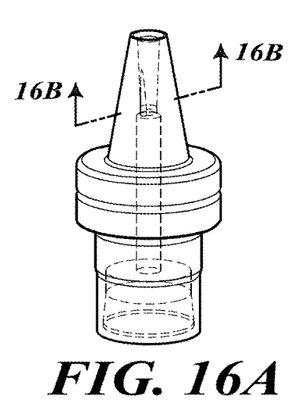
FIG. 16A is an isometric view of a valve seat, according to another embodiment, showing internal features thereof in broken lines.
Figure 16B:
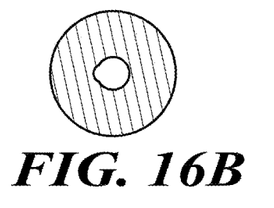
FIG. 16B is a cross-sectional view of the valve seat of FIG. 16A taken along line 16B-16B.

With reference to FIGS. 6A and 6B, the asymmetrical surface feature (e.g., notch 19) may be formed in the valve pin 18 and may be at most symmetric about only one plane of symmetry that includes the central axis $A_{pin}$ of the valve pin 18. For example, according to the example embodiment of the valve pin 18 shown in FIGS. 6A and 6B, the notch 19 is formed in one side of the end 50 of the engagement portion 38 and is symmetric only about a single plane of symmetry that includes the central axis $A_{pin}$, namely, a plane perpendicular to the reference plane P labeled in FIGS. 6A and 6B, which bisects the valve pin 18 into opposing sides. The asymmetrical surface feature may be described as an indentation, depression, notch, hole, aperture or cavity provided at one of the opposing sides of the valve pin 18. The asymmetrical surface feature of the example embodiment of the valve pin 18 shown in FIGS. 6A and 6B, for example, is a V-shaped notch with a throat portion thereof located near the reference plane P that bisects the valve pin 18. In some instances, the asymmetrical surface feature (e.g., notch 19) may be located entirely to one side of the vertical reference plane P that includes the central axis $A_{pin}$ of the valve pin 18. In some instances, the asymmetrical surface feature may be bound by a reference prism, namely a semi-cylinder reference prism, defined by the vertical reference plane P and a semicircular outer edge of the valve pin 18 at the downstream end of the asymmetrical surface feature projected along a height of the asymmetrical surface feature. In some instances, the asymmetrical surface feature may be offset from a terminal end 51 of the valve pin 18, such as, for example, as shown in the example embodiment of FIGS. 6A and 6B. In other instances, the asymmetrical surface feature may extend to the terminal end 51 of the valve pin 18.

In some embodiments, the tapered surface 44 of the valve seat 12 defined by the valve pin receiving aperture 42 may have a draft angle between about two and about five degrees. In other embodiments, the draft angle may be less than two degrees or greater than five degrees. In a similar fashion, the tapered surface 40 of the engagement portion 38 of the valve pin 18 may have a draft angle between about two and about five degrees, or may have a draft angle less than two degrees or greater than five degrees. Irrespective of the particular draft angles, the tapered surface 44 of the valve seat 12 defined by the valve pin receiving aperture 42 is nevertheless sized to sealingly receive the engagement portion 38 of the valve pin 18 in the seated configuration S.

In some embodiments, the valve pin 18 may be inserted in the valve seat 12 to a substantial degree when in the seated configuration S, such as, for example, at least about 0.40 inches. It is believed that by dissipating the energy of the pressurized fluid over a relatively large surface area created by the tapered surface 40 of the valve pin 18 and the tapered surface 44 of the valve seat 12, the energy may be dissipated relatively more slowly, thereby minimizing the destructive effects of erosion and cavitation caused by rapid pressure changes.

To further enhance the performance of the regulator valve assembly 10, annular grooves 54 may also be provided on the valve pin 18. In some embodiments, at least one annular groove 54 may be positioned near the asymmetric surface feature of the valve pin 18, when provided. A small change in the bypass flow rate across a valve pin 18 having annular grooves 54 can advantageously result in a significantly smaller pressure change as compared to a similar valve pin 18 without such grooves 54. It is believed that by providing annular grooves 54 on the valve pin 18, the fluid flow is better maintained in a turbulent condition. In some embodiments, the valve pin 18 may also be provided with a wear-resistant coating, such as, for example, titanium nitride.

Figure 3:
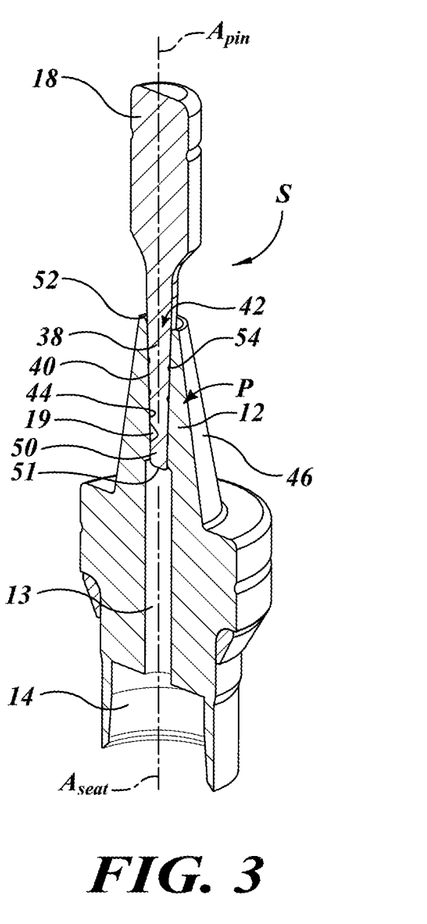
FIG. 3 is an isometric cross-sectional view of a poppet or valve pin received in a valve seat of the regulator valve assembly of FIG. 1.
Figure 4:
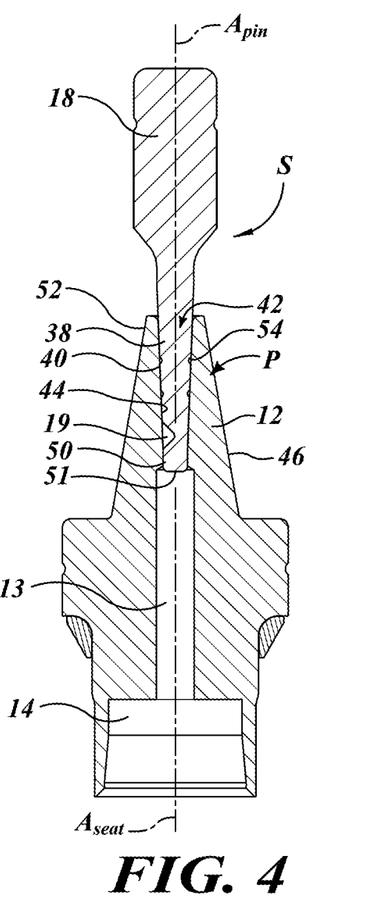
FIG. 4 is a cross-sectional view of the valve pin and valve seat of the regulator valve assembly of FIG. 1 shown in a seated configuration.

As illustrated in FIGS. 3 through 5, an exterior surface 46 of the valve seat 12 proximate to the valve pin receiving aperture 42 may be tapered in an opposite direction to that of valve pin receiving aperture 42, such that a ratio of the outer diameter of the valve seat 12 to a diameter of valve pin receiving aperture 42 is greater in an upstream direction of fluid flow.

Although dimensions of the components described herein may vary depending on operating conditions and other factors, in one example embodiment, the valve seat 12 has a valve pin receiving aperture 42 that is about 0.45 inch long, having an inner diameter at its smallest end of about 0.09 inch and a draft angle of about 2.2 degrees; the engagement portion 38 of the valve pin 18 is about 0.55 inch long, having a diameter of 0.08 inch at its smallest end and a draft angle of about 2.2 degrees; and the asymmetric surface feature 19 is provided in the form of a notch having a radius of curvature at a throat thereof of about 0.02 inch with a center of the radius of curvature located at about 0.15 inch from the terminal end 51 of the valve pin 18, and the notch 19 further having opposing notch faces with an included angle therebetween of about 75° to about 105°. In other embodiments, a regulator valve assembly 10 may have a valve seat 12 and a valve pin 18 with features that are scaled to handle a larger or smaller flow rate than the embodiment described immediately above.

With reference to FIG. 6B, and according to one specific example embodiment, the asymmetric surface feature 19 is provided in the form of a V-shaped notch on the valve pin 18. The V-shaped notch has a mouth opening distance A of about 0.06 inch and a downstream end of the mouth opening is located a distance B of about 0.18 inch from the terminal end 51 of the valve pin 18. The terminal end 51 of the valve pin 18 has a width E of about 0.088 inch and a depth of the V-shaped notch is less than or equal to half of the width E of the terminal end 51 of the valve pin 18. The V-shaped notch includes opposing notch faces with an included angle α therebetween of about 90°. The valve pin 18 further includes annular grooves 54 downstream of the V-shaped notch centered at distances C,D of about 0.28 inch and 0.40 inch. The cross-sectional profile of the annular grooves 54 is a small fraction (e.g., ¹/₁₀ or smaller) of the cross-sectional profile of the V-shaped notch.

Comparative tests were conducted between regulator valve assemblies 10 each having a valve pin 18 with an asymmetric surface feature 19 in the form of the aforementioned V-shaped notch described immediately above and similarly constructed regulator valve assemblies lacking such an asymmetric surface feature. The tests were conducted in connection with a host waterjet cutting system at an operating pressure of 55,000 psi and under consistent operating parameters. The regulator valve assemblies 10 each having the valve pin 18 with the asymmetric surface feature 19 showed extraordinary improvements in valve performance, namely, in the reduction or elimination of undesirable pressure fluctuations or "bouncing" otherwise observed in instances with valve pins lacking such an asymmetric surface feature 19. For example, no appreciable pressure signal bounce was observed during quick pressure changes such as during on/off valve cycling or during rapid changes in air pressure supplied to a pneumatic actuator 20 of the valve assembly 10. Some minimal pressure signal bounce was observed during system startup but quickly dissipated (e.g., within 2-3 s in some instances). Regulator valve assemblies 10 each having a valve pin 18 with an asymmetric surface feature 19 in the form of the aforementioned V-shaped notch were also cycle tested for extended operational periods (greater than 400 hours) to test durability, and no appreciable wear was detected in the valve pins 18 in the vicinity of the asymmetric surface feature 19. Accordingly, the example embodiment exhibited exceptional valve performance and durability.

FIGS. 6A through 11B illustrate example embodiments of poppets or valve pins having a variety of asymmetric surface features at an engagement end thereof. It will be appreciated by one of ordinary skill in the relevant art that such asymmetric surface features may be provided in a variety of shapes and sizes and may be tailored to provide suitable dampening, minimization or substantial elimination of pressure fluctuations under various operating conditions and parameters, and may vary in shape, size and location from the example asymmetric surface features of the illustrated embodiments of the valve pins shown in FIGS. 6A through 11B.

FIGS. 12A through 16B illustrate example embodiments of valve seats having a variety of asymmetric surface features within a valve seating portion thereof. It will be appreciated by one of ordinary skill in the relevant art that such asymmetric surface features may be provided in a variety of shapes and sizes and may be tailored to provide suitable dampening, minimization or substantial elimination of pressure fluctuations under various operating conditions and parameters, and may vary in shape, size and location from the example asymmetric surface features of the illustrated embodiments of the valve seats shown in FIGS. 12A through 16B.

In light of FIGS. 12A through 16B, it will be readily apparent to one of ordinary skill in the relevant art that an asymmetrical surface feature may be formed in the valve seat (e.g., valve seat 12 of the example embodiment shown in FIGS. 1 through 5) in addition to or in lieu of an asymmetrical surface feature formed in the valve pin 18 to provide valve pin biasing functionality. Similar to the asymmetric surface feature of the valve pin 18, the asymmetrical surface feature of the valve seat 12 may be described as an indentation, depression, notch, hole, aperture or cavity provided in one side of the tapered surface 44 of the valve seat 12. When provided in the valve seat 12, the asymmetric surface feature may be at most symmetric about only one plane of symmetry that includes the central axis $A_{seat}$ of the valve seat 12. In some instances, the asymmetrical surface feature may be located entirely to one side of a vertical reference plane that includes the central axis $A_{seat}$ of the valve seat 12 and bisects the valve seat 12. In some instances the asymmetrical surface feature may be bound by a reference prism, namely a semi-cylinder reference prism, defined by the vertical reference plane and a semicircular outer edge of the valve seat 12 at an upstream end of the asymmetrical surface feature projected along a height of the asymmetrical surface feature. In some instances the asymmetrical surface feature may be offset from a terminal end 52 of the valve seat 12. In other instances the asymmetrical surface feature may extend to the terminal end 52 of the valve seat 12. In some instances the asymmetrical surface feature may extend entirely through the valve seat 12. In other instances the asymmetrical surface feature may terminate within the valve seat 12, and thus not extend entirely through the valve seat 12.

Irrespective of whether an asymmetric surface feature is provided in the valve pin 18, the valve seat 12, or both, the asymmetrical surface feature(s) may be formed from a material removal process, an additive manufacturing process, or other process.

When the valve pin 18 is displaced away from the seated configuration S, a flow of fluid interacts with the asymmetric surface feature(s) to cause an imbalance in hydrodynamic forces that disrupts an otherwise uniform flow path along a length of one side of the valve pin 18 to bias the end 50 of the valve pin 18 away from the central axis $A_{seat}$ of the valve seat 12. More particularly, during operation, the valve pin 18 is positioned to be exposed to a fluid having variable pressure within the fluid inlet conduit 13 of the valve seat 12 such that, when the pressure of the fluid is sufficient to overcome a control force which biases the valve pin 18 toward the seated configuration S, the valve pin 18 is forced to move away from the seated configuration S to create the annular space 48, thereby allowing fluid to pass through the annular space 48 and to interact with the asymmetrical surface feature(s). As previously described, the asymmetrical surface feature(s) may be configured to substantially stabilize a pressure signal corresponding to the pressure of the fluid passing through the annular space 48 during operation by biasing the valve pin 18 away from the central axis $A_{seat}$ of the valve seat. Absent such asymmetric surface feature(s), hydrodynamic forces remain substantially uniform around the end 50 of the valve pin 18 and it is believed that the valve pin 18 is therefore free to oscillate undesirably side to side within the valve seat 12. Accordingly, by providing an arrangement in which fluid flow through the regulator valve assembly 10 causes the valve pin 18 to favor one side or direction over others, such oscillations can be reduced or substantially eliminated, and thereby advantageously increase service life.

Although the regulator valve assemblies 10 and components thereof described herein have been discussed in the context of high pressure and ultrahigh pressure fluid systems, including high pressure and ultrahigh pressure pumps, it is appreciated that aspects and features of the same may be applicable to other fluid systems and applications. In addition, although each of the example embodiments of the valve pins and valve seats shown in the Figures includes a single asymmetric surface feature formed therein, it is appreciated that two or more distinct surface features may be provided in such components to provide the functionality described herein.

Moreover, aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

To the extent that they are not inconsistent with the specific teachings and definitions herein, all of the US patents, US patent application publications, US patent applications, referred to in this specification and/or listed in the Application Data Sheet, including but not limited to U.S. Patent Application Ser. No. 62/296,423, filed Feb. 17, 2016, are incorporated herein by reference in their entirety.

The invention claimed is:

1. A regulator valve assembly comprising:
    a valve pin having an engagement portion with a tapered surface; and
    a valve seat having a valve pin receiving aperture defining a tapered surface on the valve seat at least a portion of the tapered surface of the valve seat sealingly mates with at least a portion of the tapered surface of the valve pin when the valve pin is seated against the valve seat in a seated configuration, and
    wherein the portion of the tapered surface of the valve pin comprises an asymmetrical surface feature sized and shaped such that when the valve pin is displaced away from the seated configuration fluid flows through an annular space that includes an area bounded by two concentric circles between the engagement portion of the valve pin and the valve seat, and the asymmetrical surface feature is a notch that includes opposing faces angularly offset by between about 75 degrees and about 105 degrees.

2. The regulator valve assembly of claim 1, further comprising:
    a housing defining a fluid outlet chamber, the valve seat positioned within the housing such that, when the valve pin is displaced away from the seated configuration, the annular space created between the engagement portion of the valve pin and the valve seat is in fluid communication with the fluid outlet chamber and an end of the valve pin is biased away from a centerline of the valve seat toward a sidewall of the housing within the confines of the valve pin receiving aperture.

3. The regulator valve assembly of claim 1 wherein the tapered surface of the valve pin has a draft angle between about two and about five degrees at least in an immediate area next to the asymmetrical surface feature.

4. The regulator valve assembly of claim 1 wherein the valve pin defines a central axis and the asymmetrical surface feature is at most symmetric about only one plane of symmetry that includes the central axis of the valve pin.

5. The regulator valve assembly of claim 4 wherein the asymmetrical surface feature is located entirely to one side of a vertical reference plane that includes the central axis of the valve pin and bisects the valve pin.

6. The regulator valve assembly of claim 5 wherein the asymmetrical surface feature is bound by a reference prism defined by the vertical reference plane and a semicircular outer edge of the valve pin projected along a height of the asymmetrical surface feature.

7. The regulator valve assembly of claim 4 wherein the asymmetrical surface feature is offset from a terminal end of the valve pin.

8. The regulator valve assembly of claim 4 wherein the asymmetrical surface feature extends to a terminal end of the valve pin.

9. The regulator valve assembly of claim 4 wherein one or more annular grooves are provided on the tapered surface of the engagement portion of the valve pin, and wherein at least one of the annular grooves is positioned near the asymmetric surface feature.

10. The regulator valve assembly of claim 1 wherein the asymmetrical surface feature is formed from a material removal process or an additive manufacturing process.

11. The regulator valve assembly of claim 1 wherein, when the valve pin is displaced away from the seated configuration, the flow of fluid interacts with the asymmetric surface feature to cause an imbalance in hydrodynamic forces that disrupts an otherwise uniform flow path along a length of one side of the valve pin to bias an end of the valve pin away from a central axis of the valve seat.

12. The regulator valve assembly of claim 1 wherein the valve seat includes a fluid inlet conduit that is in fluid communication with the valve pin receiving aperture, and wherein the valve pin is positioned to be exposed to a fluid having variable pressure within the fluid inlet conduit of the valve seat during operation such that, when the pressure of the fluid is sufficient to overcome a control force which biases the valve pin toward the seated configuration, the valve pin is forced to move away from the seated configuration to create the annular space, thereby allowing fluid to pass through the annular space and interact with the asymmetrical surface feature.

13. A regulator valve assembly comprising:
    a valve pin having an engagement portion with a tapered surface; and
    a valve seat having a valve pin receiving aperture defining a tapered surface on the valve seat at least a portion of the tapered surface of the valve seat sealingly mates with at least a portion of the tapered surface of the valve pin when the valve pin is seated against the valve seat in a seated configuration, and
    wherein the portion of the tapered surface of the valve pin comprises an asymmetrical surface feature sized and shaped such that when the valve pin is displaced away from the seated configuration fluid flows through an annular space that includes an area bounded by two concentric circles between the engagement portion of the valve pin and the valve seat, the asymmetrical surface feature having a depth, and
    wherein one or more annular grooves are provided on the tapered surface of the engagement portion of the valve pin, and at least one of the one or more annular grooves has a depth that is one-tenth or less of the depth of the asymmetrical surface feature.

14. The regulator valve assembly of claim 13, further comprising:
    a housing defining a fluid outlet chamber, the valve seat positioned within the housing such that, when the valve pin is displaced away from the seated configuration, the annular space created between the engagement portion of the valve pin and the valve seat is in fluid communication with the fluid outlet chamber and an end of the valve pin is biased away from a centerline of the valve seat toward a sidewall of the housing within the confines of the valve pin receiving aperture.

15. The regulator valve assembly of claim 13 wherein the tapered surface of the valve pin has a draft angle between about two and about five degrees at least in an immediate area next to the asymmetrical surface feature.

16. The regulator valve assembly of claim 13 wherein the valve pin defines a central axis, and the asymmetrical surface feature is at most symmetric about only one plane of symmetry that includes the central axis of the valve pin.

17. The regulator valve assembly of claim 16 wherein the asymmetrical surface feature is located entirely to one side of a vertical reference plane that includes the central axis of the valve pin and bisects the valve pin.

18. The regulator valve assembly of claim 17 wherein the asymmetrical surface feature is bound by a reference prism defined by the vertical reference plane and a semicircular outer edge of the valve pin projected along a height of the asymmetrical surface feature.

19. The regulator valve assembly of claim 16 wherein the asymmetrical surface feature is offset from a terminal end of the valve pin.

20. The regulator valve assembly of claim 16 wherein the asymmetrical surface feature extends to a terminal end of the valve pin.

21. The regulator valve assembly of claim 13 wherein the asymmetrical surface feature is formed from a material removal process or an additive manufacturing process.

22. The regulator valve assembly of claim 13 wherein, when the valve pin is displaced away from the seated configuration, the flow of fluid interacts with the asymmetric surface feature to cause an imbalance in hydrodynamic forces that disrupts an otherwise uniform flow path along a length of one side of the valve pin to bias an end of the valve pin away from a central axis of the valve seat.

23. The regulator valve assembly of claim 13 wherein the valve seat includes a fluid inlet conduit that is in fluid communication with the valve pin receiving aperture, and wherein the valve pin is positioned to be exposed to a fluid having variable pressure within the fluid inlet conduit of the valve seat during operation such that, when the pressure of the fluid is sufficient to overcome a control force which biases the valve pin toward the seated configuration, the valve pin is forced to move away from the seated configuration to create the annular space, thereby allowing fluid to pass through the annular space and interact with the asymmetrical surface feature.

\* \* \* \* \*